(12) United States Patent
Dufour et al.

(10) Patent No.: US 8,454,279 B2
(45) Date of Patent: *Jun. 4, 2013

(54) CUTTING TOOL SYSTEM, CUTTING INSERT, AND TOOL HOLDER

(75) Inventors: Jean-Luc Dufour, Franklin, TN (US); X. Daniel Fang, Brentwood, TN (US); David J. Wills, Brentwood, TN (US); Thomas B. Hartman, Murfreesboro, TN (US)

(73) Assignee: TDY Industries, LLC, Pittsburgh, PA (US)

( * ) Notice: Subject to any disclaimer, the term of this patent is extended or adjusted under 35 U.S.C. 154(b) by 158 days.

This patent is subject to a terminal disclaimer.

(21) Appl. No.: 12/967,441

(22) Filed: Dec. 14, 2010

(65) Prior Publication Data

US 2011/0110731 A1    May 12, 2011

Related U.S. Application Data

(63) Continuation of application No. 12/116,489, filed on May 7, 2008.

(51) Int. Cl.
*B23C 5/207* (2006.01)
*B23C 2200/201* (2006.01)

(52) U.S. Cl.
USPC .......................................... 407/113; 407/115

(58) Field of Classification Search
USPC ...................................... 407/113–116, 67, 66
See application file for complete search history.

(56) References Cited

U.S. PATENT DOCUMENTS

| | | |
|---|---|---|
| 1,838,520 A | 12/1931 | Archer |
| 3,805,349 A | 4/1974 | Nose |
| 4,412,763 A | 11/1983 | Shallenberger, Jr. |
| 5,145,294 A | 9/1992 | Flueckiger |
| 5,695,303 A | 12/1997 | Boianjiu et al. |
| 5,951,213 A | 9/1999 | Fauser et al. |
| 6,164,878 A | 12/2000 | Satran et al. |
| 6,234,724 B1 | 5/2001 | Satran et al. |
| 6,257,807 B1 | 7/2001 | Heinloth |
| 6,599,061 B1 | 7/2003 | Nelson |
| 6,811,359 B2 | 11/2004 | Craig |

(Continued)

FOREIGN PATENT DOCUMENTS

| | | |
|---|---|---|
| CN | 1130884 A | 9/1996 |
| CN | 1171314 A | 1/1998 |

(Continued)

OTHER PUBLICATIONS

U.S. Appl. No. 13/721,335, filed Dec. 20, 2012, (34 pages).

*Primary Examiner* — Will Fridie, Jr.
(74) *Attorney, Agent, or Firm* — K & L Gates LLP; Patrick J. Viccaro; John E. Grosselin, III

(57) ABSTRACT

An improved design of a cutting insert system includes a plurality of indexable peripheral milling cutting inserts adapted to be mounted on a peripheral milling tool holder. Each of the cutting inserts includes an insert width that is the same for each cutting insert. Each of the cutting inserts also includes a corner nose having a corner nose radius dimension that is different for each cutting insert, and an axial alignment clearance face that defines an equivalent face location and an equivalent clearance angle for each of the plurality of cutting inserts when the insert is detachably mounted on the tool holder.

22 Claims, 11 Drawing Sheets

U.S. PATENT DOCUMENTS

| | | | |
|---|---|---|---|
| 7,021,871 B2 * | 4/2006 | Arvidsson et al. | 407/113 |
| 7,104,736 B2 | 9/2006 | Satran et al. | |
| 7,147,407 B2 | 12/2006 | Satran | |
| 7,201,545 B2 * | 4/2007 | Ejderklint | 409/131 |
| 7,367,755 B2 | 5/2008 | Wurfels et al. | |
| 7,494,303 B2 | 2/2009 | Koskinen | |
| 7,537,419 B2 * | 5/2009 | Sjoberg et al. | 407/103 |
| 7,547,164 B2 | 6/2009 | Hessman | |
| 7,604,440 B2 | 10/2009 | Fouquer | |
| 7,687,156 B2 | 3/2010 | Fang et al. | |
| 7,846,551 B2 | 12/2010 | Fang et al. | |
| 7,905,687 B2 | 3/2011 | Dufour et al. | |
| 7,905,689 B2 | 3/2011 | Dufour et al. | |
| 8,096,735 B2 | 1/2012 | Sladek et al. | |
| 8,162,572 B2 | 4/2012 | Festeau et al. | |
| 8,277,151 B2 | 10/2012 | Wandeback | |
| 2007/0041798 A1 | 2/2007 | Nasu et al. | |
| 2008/0304924 A1 | 12/2008 | Engstrom | |
| 2010/0303563 A1 | 12/2010 | Fang et al. | |
| 2010/0329800 A1 | 12/2010 | Edler et al. | |
| 2012/0213605 A1 | 8/2012 | Festeau et al. | |

FOREIGN PATENT DOCUMENTS

| | | |
|---|---|---|
| CN | 1484563 A1 | 3/2004 |
| DE | 9400327 U1 | 3/1994 |
| EP | 0432340 A1 | 6/1991 |
| EP | 1952925 A2 | 8/2008 |
| EP | 2119520 A1 | 11/2009 |
| GB | 951624 | 3/1964 |
| IL | 169340 | 4/2010 |
| JP | 52-103081 A | 8/1977 |
| JP | 61-201719 U | 12/1986 |
| JP | 8-243831 A | 9/1996 |
| JP | 2003-25135 A | 1/2003 |
| JP | 2004-291099 | 10/2004 |
| KR | 10-0430868 | 6/2004 |
| RU | 2138371 C1 | 9/1999 |
| RU | 2005110805 A | 10/2006 |
| RU | 2318634 C2 | 3/2008 |
| SU | 1278110 A1 | 12/1986 |
| WO | WO 02/20206 A1 | 3/2002 |

* cited by examiner

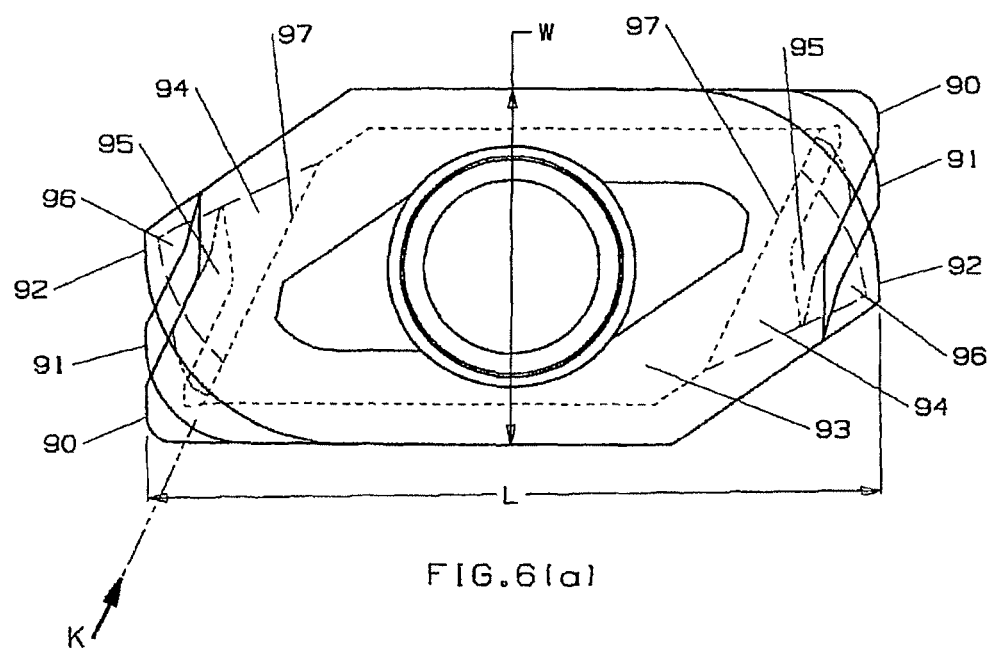
FIG.6(a)
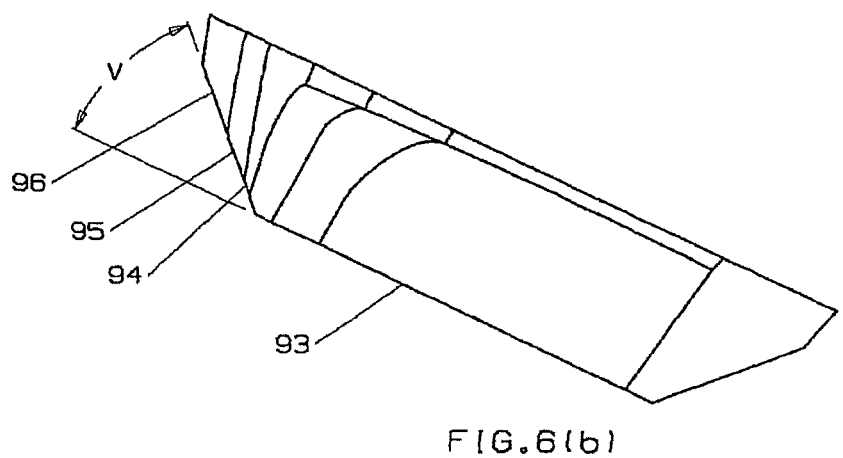
FIG.6(b)
FIGURE 6

CUTTING TOOL SYSTEM, CUTTING INSERT, AND TOOL HOLDER

CROSS REFERENCE TO RELATED APPLICATION

This application is a continuation of U.S. application Ser. No. 12/116,489 filed May 7, 2008, which is incorporated by reference herein in its entirety.

BACKGROUND OF THE TECHNOLOGY

1. Field of the Technology

The present disclosure is directed to cutting tool systems, cutting inserts, and tool holders. Certain embodiments described in the present disclosure are directed to generally parallelogram-shaped replaceable and indexable cutting inserts and to cutting tool systems including the cutting inserts.

2. Description of the Background of the Technology

Cutting inserts used in peripheral rotary milling typically are generally parallelogram-shaped. These inserts have a generally parallelogram-shaped profile when viewed from a point above the top surface of the cutting insert, with two long sides forming two main or "radial" cutting edges, and two short sides forming two minor or "axial" cutting edges. As compared with other types of cutting inserts for peripheral rotary milling, generally parallelogram-shaped cutting inserts have a more positive cutting geometry and provide more efficient machining because the inserts' long radial cutting edges provide a larger depth of cut.

Current designs of generally parallelogram-shaped cutting inserts are complex in geometry, and the associated tool holders, on which the inserts are mounted, typically are cylindrical in shape, allowing a plurality of the inserts to be mounted about the outer periphery of the tool holder body. Generally parallelogram-shaped cutting inserts are commonly available in sets or "families", where each family member has substantially the same width and certain other common geometric characteristics, but includes a different corner nose radius. Thus, a family of inserts may comprise several inserts, and each such insert has a gradually increasing corner nose radius. Corner nose radii within a family of parallelogram-shaped rotary milling inserts typically may be from 0.2 mm up to 6.4 mm or more, depending on the particular insert width of the family. Certain parallelogram-shaped cutting inserts adapted for peripheral milling applications, for example, have corner nose radii as large as 8 to 10 mm.

The present inventors have discerned that a deficiency in existing tool systems utilizing generally parallelogram-shaped cutting inserts is that several different tool holders may be required to accommodate all of the inserts in a single insert family. As discussed below, this requirement typically results from the fact that substantial differences in corner nose radius between conventional inserts in a given family require different insert pocket geometries, even though the width of each insert within the family is substantially identical. A conventional tool holder adapted for holding generally parallelogram-shaped cutting inserts having a relatively small corner radius cannot be used to securely hold an insert in the same family having a substantially larger corner nose radius. This incompatibility may require an operator to change tool holders when machining using two or more inserts within a given family, resulting in machine tool downtime and consequent productivity losses. Tool holder manufacturers and distributors also must manufacture and/or stock multiple tool holders to accommodate a given insert family, which diverts limited resources and complicates sales and distribution efforts.

Therefore, a need exists for an improved cutting tool system for peripheral rotary milling wherein a single tool holder able can accommodate and securely retain an entire family of generally parallelogram-shaped cutting inserts having a range of significantly varying corner nose radii. The present inventors disclose herein a unique system adapted to satisfy this unmet need. It is believed that the novel cutting tool system and cutting inserts disclosed and claimed herein will have a considerable positive economic impact on cutting tool manufacturers and distributors, and on cutting tool end users.

SUMMARY

According to one non-limiting aspect of the present disclosure, a cutting insert system is provided including a plurality of indexable peripheral milling cutting inserts that are adapted to be mounted on a peripheral milling tool holder. Each of the plurality of cutting inserts includes an insert width, wherein the insert width is the same for each cutting insert, and a corner nose having a corner nose radius dimension, wherein the corner nose radius dimension is different for each cutting insert. Each of the plurality of cutting inserts also includes an axial alignment clearance face, wherein the axial alignment clearance face defines an equivalent face location and an equivalent clearance angle for each of the plurality of cutting inserts when the insert is detachably mounted on the peripheral milling tool holder. In certain embodiments, each of the plurality of cutting inserts is generally parallelogram-shaped. Non-limiting examples of the geometry of the alignment clearance face of each of the plurality of cutting inserts include substantially planar and substantially conical arrangements.

According to another non-limiting aspect of the present disclosure, a cutting tool system is disclosed including a tool holder comprising at least one insert pocket, and a plurality of indexable peripheral milling cutting inserts. Each of the cutting inserts is adapted to be securely retained in the insert pocket. Each of the cutting inserts includes an insert width, wherein the insert width is the same for each cutting insert; a corner nose having a corner nose radius dimension, wherein the corner nose radius dimension is different for each of the plurality of cutting inserts; and an axial alignment clearance face, wherein the axial alignment clearance face defines an equivalent face location and an equivalent clearance angle for each of the plurality of cutting inserts when each of the plurality of inserts is securely retained in the at least one insert pocket of the tool holder. In certain embodiments, each of the plurality of cutting inserts is generally parallelogram-shaped. Non-limiting examples of the geometry of the alignment clearance face of each of the plurality of cutting inserts include substantially planar and substantially conical arrangements.

According to yet another non-limiting aspect of the present disclosure, a cutting tool system is disclosed including a peripheral milling tool holder including at least one insert pocket on a translatable portion of the tool holder; and a plurality of indexable peripheral milling cutting inserts having differing corner nose radii. Each of the plurality of cutting inserts can be securely retained within the insert pocket of the tool holder in a position suitable for machining a workpiece. In certain embodiments of the cutting tool system, each of the plurality of indexable peripheral milling cutting inserts is generally parallelogram-shaped. Also, in certain embodiments of the cutting tool system, each of the plurality of indexable peripheral milling cutting inserts includes an alignment clearance face defining a clearance angle that is substantially identical on each of the cutting inserts. In certain non-limiting embodiments, each alignment clearance face is substantially planar or substantially conical.

BRIEF DESCRIPTION OF THE DRAWINGS

The features and advantages of apparatus and methods described herein may be better understood by reference to the accompanying drawings in which:

FIGS. 6(a) and 6(b) schematically depict three superimposed generally parallelogram-shaped peripheral milling inserts within an insert family according to one non-limiting embodiment of the present disclosure, wherein the cutting inserts have different corner nose radii;

The reader will appreciate the foregoing details, as well as others, upon considering the following detailed description of certain non-limiting embodiments according to the present disclosure. The reader also may comprehend certain of such additional details upon carrying out or using the cutting inserts, cutting tool holders, cutting tool systems, and methods described herein.

DETAILED DESCRIPTION OF CERTAIN NON-LIMITING EMBODIMENTS

In the present description of non-limiting embodiments and in the claims, other than in the operating examples or where otherwise indicated, all numbers expressing quantities or characteristics are to be understood as being modified in all instances by the term "about". Accordingly, unless indicated to the contrary, any numerical parameters set forth in the following description and the attached claims are approximations that may vary depending on the desired characteristics one seeks to obtain in the cutting inserts, cutting tool holder, cutting tool systems, and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Figure 1:
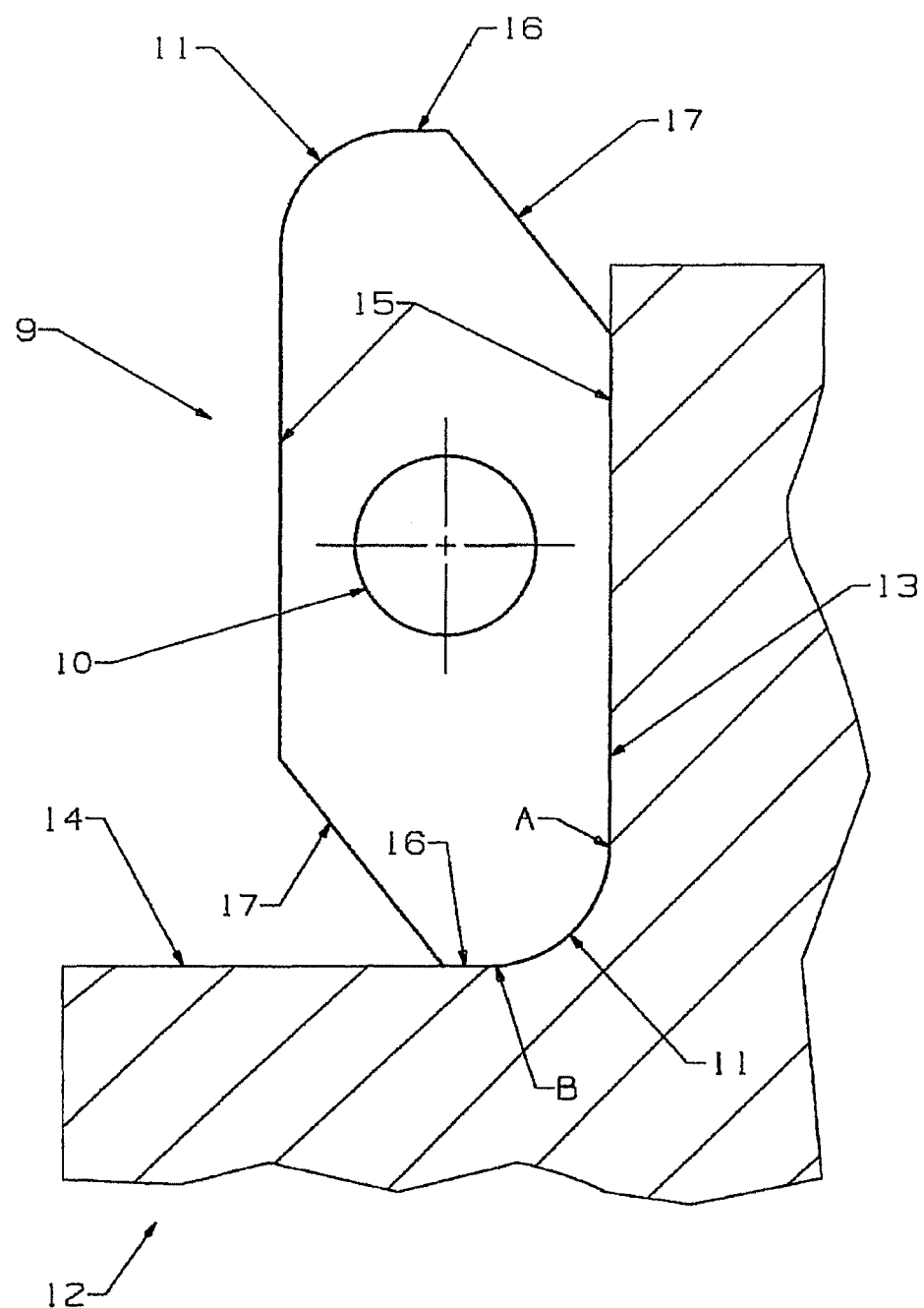
FIG. 1 is a simplified schematic view of a generally parallelogram-shaped peripheral milling insert shown in contact with a workpiece.

Generally parallelogram-shaped cutting inserts are commonly used in peripheral rotary milling to create a square shoulder on the machined workpiece. Thus, the corner nose of a generally parallelogram-shaped cutting insert should extend a full quarter of a circle to maintain both radial and axial cutting edges in contact with the workpiece during the machining process and provide a square shoulder. FIG. 1 schematically depicts a top face view of a simplified generally parallelogram-shaped cutting insert 9 of a conventional design used for peripheral milling and shown in contact with a workpiece 12. Cutting insert 9 includes center hole 10, corner noses 11, opposed radial cutting edges 15, primary axial cutting edges 16, and secondary axial cutting edges 17. Cutting insert 9 is depicted machining vertical wall 13 and horizontal wall 14 in workpiece 12 to provide a square shoulder in the workpiece. The tool holder is not shown in FIG. 1 for purposes of simplification. As depicted in FIG. 1, lower corner nose 11 is tangent to the workpiece 12 at Point A on the vertical wall 13 and at Point B on the horizontal wall 14. This guarantees that the shoulder angle between the vertical wall 13, formed by radial cutting edge 15, and the horizontal wall 14, formed by primary axial cutting edge 16 is substantially 90 degrees, as shown in FIG. 1.

The above-mentioned primary axial cutting edges 16 are located between a corner nose 11 and a secondary axial cutting edge 17, and should be parallel to the horizontal surface of the workpiece being machined in order to provide good surface finish and better ensure formation of a 90 degree shoulder on the machined workpiece. However, the conventional practice of including a full quarter circle corner nose tangent to both radial and primary axial cutting edges in the design of a generally parallelogram-shaped cutting insert, as is shown in FIG. 1, imposes a significant geometric constraint, which may be better understood by reference to FIG. 2, as follows.

Figure 2:
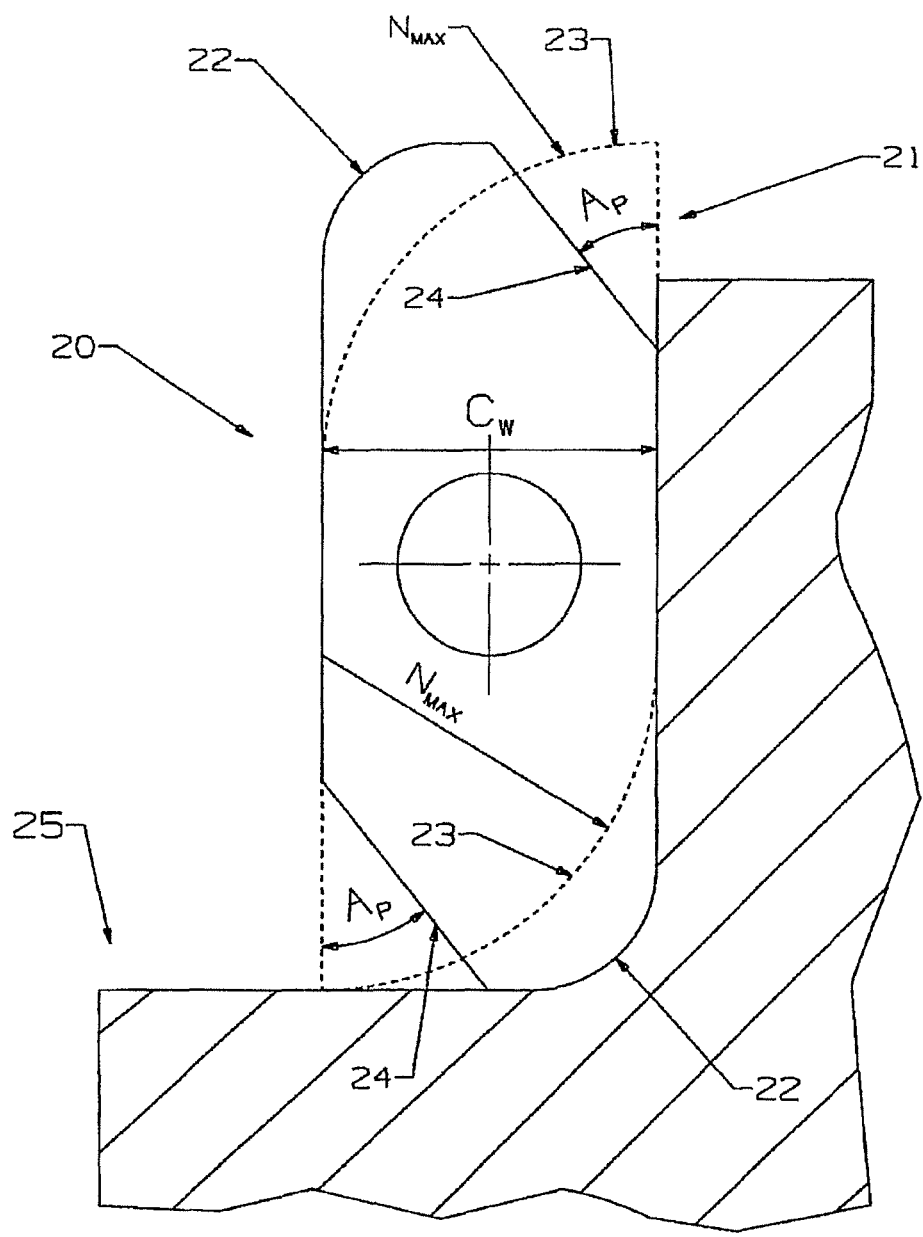
FIG. 2 is a simplified schematic view of two superimposed generally parallelogram-shaped peripheral milling inserts having different corner nose radius, wherein the inserts are shown in contact with a workpiece.

Two simplified conventional parallelogram-shaped cutting inserts 20 and 21 adapted for peripheral milling applications having the same insert width ($C_W$) are shown in FIG. 2 superimposed on one another and in contact with a workpiece 25. The illustrated perimeter of cutting insert 20 is shown entirely in solid line. The illustrated perimeter of cutting insert 21 includes the depicted dashed lines and the intervening solid lines identifying certain perimeter sections in common with cutting insert 20. Corner nose 22 of cutting insert 20 has a standard radius, while corner nose 23 of cutting insert 21 is at its maximum possible nose radius ($N_{MAX}$), which is equal to the insert width $C_W$. In reality, it would not be practical to include a nose radius equal to the insert width $C_W$ in a generally parallelogram-shaped cutting insert 21 because this results in a zero degree axial positioning angle $A_p$ and no secondary axial cutting edge (edge 24 in cutting insert 20). Such a design would make stably securing cutting insert 21 on an associated tool holder very difficult or impossible. Also, providing a generally parallelogram-shaped cutting insert with a corner nose radius that is larger than its width cannot satisfy the required insert geometry which, as discussed above, must include a full quarter circle corner nose that is tangent to both radial and primary axial cutting edges.

Thus, as illustrated in FIG. 2, one geometric constraint imposed on generally parallelogram-shaped cutting inserts for peripheral rotary milling applications is that the maximum corner nose radius $N_{MAX}$ must be smaller than the insert width $C_W$. In the cutting tool industry, the generally accepted ratio of the maximum corner nose radius $N_{MAX}$ to the insert width $C_W$ of a parallelogram-shaped cutting insert for peripheral rotary milling applications typically ranges from 0.4 to 0.65.

Due to the variations in geometric design of generally parallelogram-shaped cutting inserts and their intricate positioning relationship with the associated tool holder, as noted above, multiple tool holders are currently used in industry to accommodate a family of parallelogram-shaped cutting inserts. As also noted, cutting inserts within a family of parallelogram-shaped cutting inserts commonly have different corner nose radii. Peripheral rotary milling tool systems are not currently available wherein a single tool holder can accommodate cutting inserts having relatively large corner nose radii, as well as cutting inserts having relatively small corner nose radii. The current requirement to use multiple tool holders to accommodate a family of generally parallelogram-shaped peripheral rotary milling inserts increases cutting tool manufacturers' production costs and is wasteful of raw materials. In addition, cutting tool end users suffer from reduced productivity given the need to change the tool holder when switching between cutting inserts having significantly different corner nose radii in a given family of generally parallelogram-shaped cutting inserts.

Technical articles and patent publications regarding generally parallelogram-shaped cutting inserts known to the present inventors do not provide a tool system or method wherein an entire family of generally parallelogram-shaped cutting inserts with significantly differing corner nose radii may be accommodated on a single tool holder. Examples of patent publications related to generally parallelogram-shaped cutting inserts include: U.S. Pat. No. 5,071,292; U.S. Pat. No. 5,052,863; U.S. Pat. No. 5,388,932; U.S. Pat. No. 6,142,716; European Pat. No. 0 239 045; U.S. Patent Publication No. 2006/0013661; and U.S. Patent Publication No. 2007/0031201.

U.S. Pat. No. 5,071,292 describes a generally parallelogram-shaped cutting insert having a continuous curved radial cutting face and radial clearance face wherein both the radial rake angle and the radial clearance angle remain substantially the same along the main cutting edge with respect to the associated cutter or tool holder.

U.S. Pat. No. 5,052,863 describes a method for securely locating a generally parallelogram-shaped cutting insert having a relatively large positive radial clearance angle along the main cutting edge in a tool holder. The method involves adapting a tool holder designed to accommodate an insert having a lower radial clearance angle so as to overcome the strength problems associated with greater unsupported overhang when using generally parallelogram-shaped cutting inserts having larger radial clearance angle.

U.S. Pat. No. 5,388,932 describes providing an angled chamfer at the elevated corner nose area of a generally parallelogram-shaped cutting insert, wherein the angled chamfer increases the cutting edge strength at the main corner nose while maintaining a positive radial rake angle along the main cutting edge.

U.S. Pat. No. 6,142,716 also describes an angled chamfer having a positive radial rake angle. The chamfer comprises a recess at the major cutting sides enabling more rigid localization of the cutting insert in the tool holder and use of less material in manufacturing the cutting insert.

European Patent No. 0 239 045 provides a generally parallelogram-shaped cutting insert having a constant positive radial rake angle and a constant radial clearance angle along the major cutting edges.

U.S. Patent Publication No. 2006/0013661 discloses a relatively long edged generally parallelogram-shaped cutting insert wherein a margin surface on the radial clearance face extends from a corner nose and blends into a flat seating surface. The cutting insert provides a smooth cut during high speed milling operations.

U.S. Patent Publication No. 2007/0031201 describes a generally parallelogram-shaped cutting insert with the upper-side side surface formed as a curved face having a constant inclination angle, and the lower-side side surface formed as a flat face having a fixed inclination angle. This arrangement is reported to allow for use of an improved manufacturing process for both the die/mold of the cutting insert and the insert pocket of the tool holder, while maintaining an advantageous profile on the main cutting section of the cutting insert.

None of the above patents and publications disclose or suggest the concept of a family of generally parallelogram-shaped cutting inserts having significantly varying corner nose radii that may be accommodated on a single tool holder. Instead, as discussed above, multiple tool holders are conventionally necessary to accommodate a family of cutting inserts with a range of corner nose radii. Alternatively, cutting tool manufacturers have advised end users to modify or reshape tool holders designed for cutting inserts with smaller corner nose radii so that the holders will securely accommodate inserts having relatively larger corner nose radii.

In embodiments according to the present disclosure, a unique cutting insert design is described that allows for the use of a single tool holder to accommodate a family of cutting inserts having substantially differing corner nose radii. The unique designs and concepts described herein are particularly advantageous as applied to families of generally parallelogram-shaped cutting inserts, such as those inserts commonly used in peripheral rotary milling applications.

As used herein, a "family" of cutting inserts refers to a plurality of cutting inserts wherein each insert has a corner nose radius that differs from other cutting inserts in the family, but wherein each insert within the family is adapted for a like machining operation and has substantially the same width. The family members also may have thickness and/or other geometric features in common, and also may include the same or similar chip breaking features. It will be apparent from FIG. 2, for example, that as the corner nose radius of a peripheral milling insert is reduced (such as when changing from cutting insert 21 to cutting insert 20), the cutting operation becomes more "aggressive", meaning that a larger volume of material is removed from the workpiece, all other parameters of the cutting operation being held constant.

As used herein, a cutting insert that is "generally parallelogram-shaped" refers to a cutting insert including a set of equal-length opposed cutting edges, a set of equal length opposed axial cutting edges, and a set of opposed rounded corner noses, wherein each corner nose is intermediate, but does not necessarily intersect, a radial cutting edge and an axial cutting edge. The length of a radial cutting edge is greater than the length of an axial cutting edge, thereby imparting a generally elongate form to the cutting insert as viewed on the top face. A generally parallelogram-shaped cutting insert may be contrasted with, for example, circular- and generally square-shaped cutting inserts.

Figure 3:
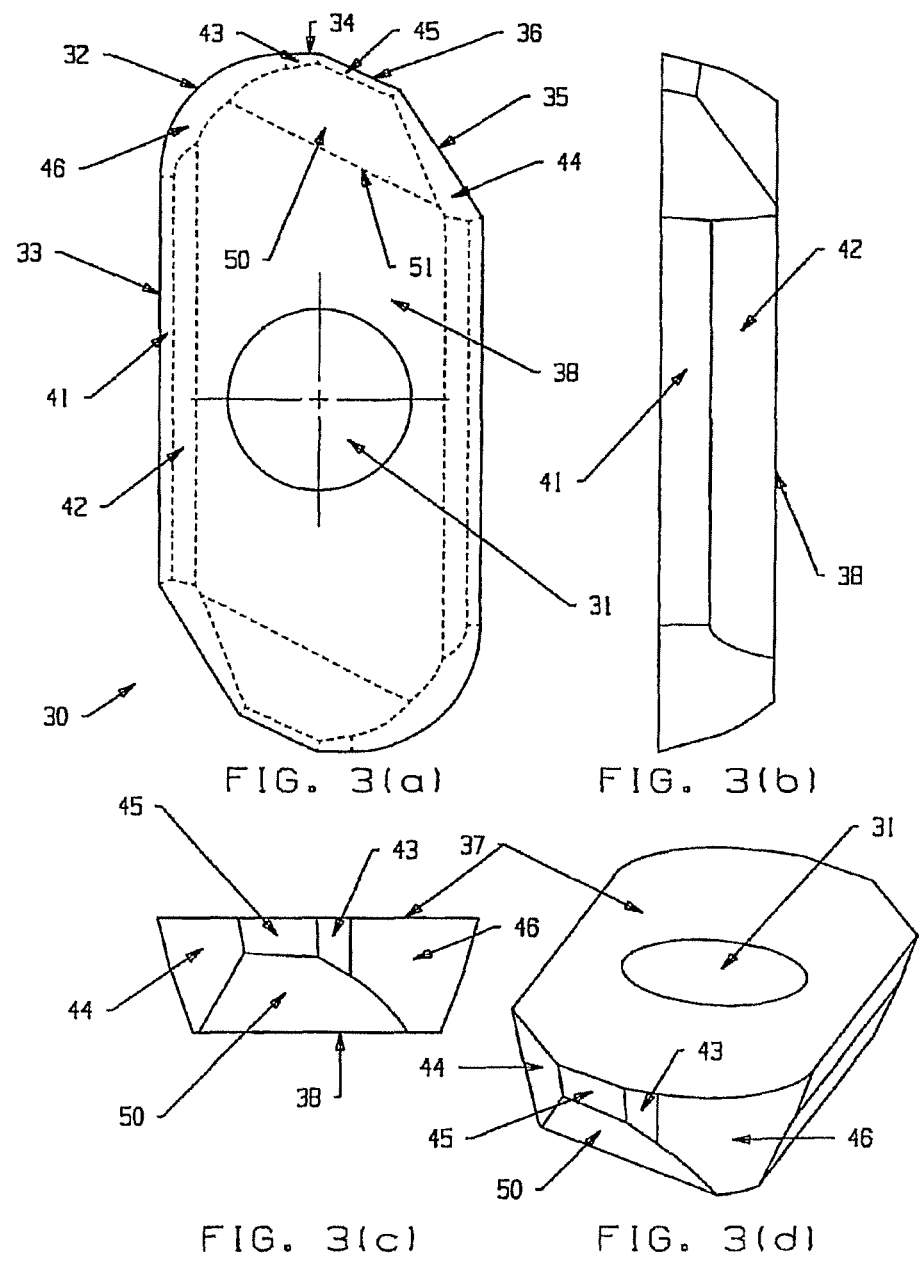
FIG. 3(a) is a schematic view of the top face of one non-limiting embodiment of a generally parallelogram-shaped peripheral milling insert according to the present disclosure.
FIG. 3(b) is a schematic elevational view of a radial clearance face of the insert of FIG. 3(a)
FIG. 3(c) is a schematic elevational view of an axial clearance face of the insert of FIG. 3(a)
FIG. 3(d) is a schematic perspective view of the insert of FIG. 3(a)

FIG. 3 schematically depicts one non-limiting embodiment of a generally parallelogram-shaped cutting insert adapted for peripheral milling and designed according to the present disclosure. FIG. 3(a) is a top face view, FIG. 3(b) is a side or radial view, FIG. 3(c) is a front end or axial view, and FIG. 3(d) is a perspective view of the embodiment. Cutting insert 30 may be 180° symmetric about the axis of center hole 31 and includes corner nose 32, radial cutting edge 33, primary axial cutting edge 34, secondary axial cutting edge 35, and bridging cutting edge 36 connecting the primary axial cutting edge 34 and the secondary axial cutting edge 35. As included in the non-limiting embodiment, cutting insert 30 includes generally planar top face 37 and generally planar bottom face 38. Primary radial clearance face 41 is inclined downwardly from radial cutting edge 33. Secondary radial clearance face 42 is inclined downwardly from the primary radial clearance face 41 and intersects bottom face 38. Primary axial clearance face 43 is inclined downwardly from the primary axial cutting edge 34. A secondary axial clearance face 44 is inclined downwardly from the secondary axial cutting edge 35. A bridging clearance face 45 is inclined downwardly from the bridging cutting edge 36. Also, conical clearance face 46 is inclined downwardly from corner nose 32. As noted above and as suggested by FIGS. 3(a) through 3(d), these features are repeated about an axis of symmetry of the cutting insert 30 coincident with the axis of center hole 31.

With reference to FIGS. 3(c) and (d), cutting insert 30 includes axial alignment clearance face 50 which intersects with primary axial clearance face 43, secondary axial clearance face 44, bridging clearance face 45, and conical clearance face 46. Axial alignment clearance face 50 also intersects bottom face 38 at bottom edge 51 of the axial alignment clearance face 50. As suggested above, an axial alignment clearance face 50 is included at both ends of the symmetric cutting insert 30 so that the insert is indexable. An axial alignment clearance face 50 of the same configuration is provided in all cutting inserts of the insert family that includes cutting insert 30. As such, each of the cutting inserts within the insert family, which have varying corner nose radii that may differ significantly from insert to insert, may be securely retained in an insert pocket of an associated tool holder. More specifically, each of the generally parallelogram-shaped cutting inserts of the insert family includes an axial alignment clearance face that has substantially the same clearance angle and face location, and assumes substantially the same positioning relationship in the insert pocket of the associated tool holder, irrespective of the corner nose radius of the particular insert within the insert family.

To demonstrate one possible method for designing the axial alignment clearance face 50 of the cutting insert 30, a mathematical description follows.

Figure 4:
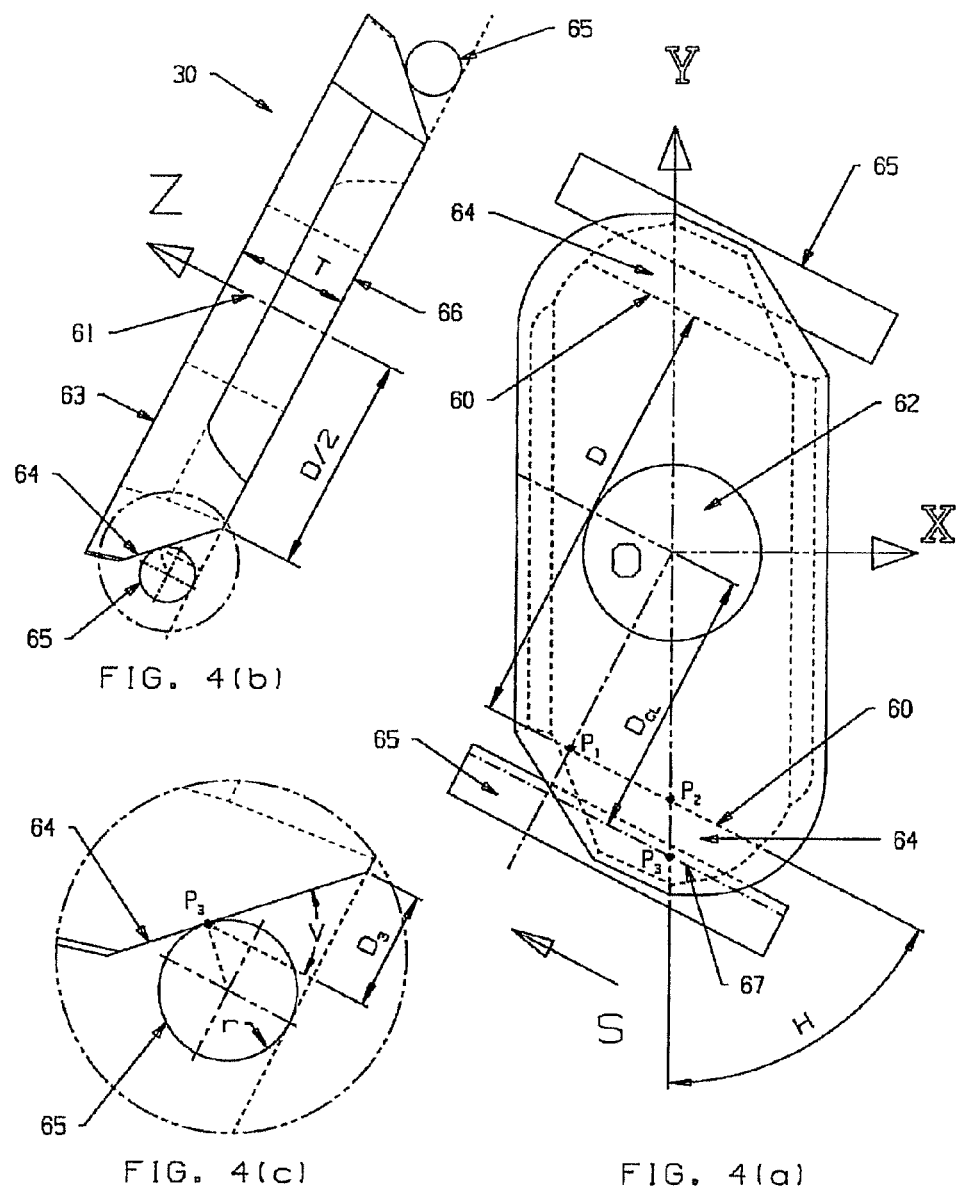
FIGS. 4(a)-4(c) are schematic views of a generally parallelogram-shaped cutting insert demonstrating a mathematical model for determining a geometry of the alignment clearance faces of the cutting insert shown in FIGS. 3(a)-3(d)

It is well known that three non-collinear points in three-dimensional (3-D) space can determine a planar face. This can be mathematically described in equation (1):

$$\begin{bmatrix} x & y & z & 1 \\ x_1 & y_1 & z_1 & 1 \\ x_2 & y_2 & z_2 & 1 \\ x_3 & y_3 & z_3 & 1 \end{bmatrix} = 0 \quad (1)$$

where $(x_1, y_1, z_1)$, $(x_2, y_2, z_2)$, and $(x_3, y_3, z_3)$ represent three non-collinear points in the XYZ coordinate system through which the planar face passes. Referring now to FIG. 4, FIG. 4(a) depicts a top face view of cutting insert 30 (as illustrated in previous FIG. 3). FIG. 4(b) depicts a side view (as viewed along the bottom edge 60, in the direction of arrow of S in FIG. 4(a)). FIG. 4(c) depicts a detailed view of the circled region of FIG. 4(b). The origin "O" of the XYZ coordinate system is set at the intersection point of the axis 61 of center hole 62 and top face 63. Referring to FIGS. 4(a) and (b), the first point $P_1$ $(x_1, y_1, z_1)$ and the second point $P_2$ $(x_2, y_2, z_2)$ of alignment clearance face 64 along bottom edge 60 (i.e., the line of intersection of alignment clearance face 64 and bottom face 66) can be defined by equations (2) and (3) which refer to the following three known parameters: the distance "D" between the two bottom edges 60; the angle "H" on the XY plane between the bottom edge 60 and the Y axis; and the thickness "T" of the cutting insert 30.

$$P_1(x_1,y_1,z_1)=(-(D/2)\times\cos(H),-(D/2)\times\sin(H),-T) \quad (2)$$

$$P_2(x_2,y_2,z_2)=(0,-(D/2)/\sin(H),-T) \quad (3)$$

The third point $P_3$ $(x_3, y_3, z_3)$ must be known to define the plane of alignment clearance face 64. To define the third point $P_3$ $(x_3, y_3, z_3)$, a gauge roll 65 is introduced. This is shown in FIGS. 4(b) and (c). Since the roll 65 is tangent to both alignment clearance face 64 and the plane extending along the bottom face 66, and also directly contacts the alignment clearance face 64, it forms a contact line 67 between the alignment clearance face 64 and the gauge roll 65. All points along the contact line 67 are points on the alignment clearance face 64. Referring to FIG. 4(c), the z component of the point $P_3$ $(x_3, y_3, z_3)$ can be determined from two additional known parameters, the clearance angle "V" of the alignment clearance face 64 and the radius "r" of the gauge roll 65, according to equation (4).

$$P_3(z_3)=r+r\times\sin(V)-T \quad (4)$$

Based on FIGS. 4(a) and 4(c), the position of the contact line 67 which is actually parallel to the bottom edge 60 can be defined by equation (5) as:

$$D_{CL}=D/2+D_3=D/2+\tan(V)\times(r+r\times\sin(V)) \quad (5)$$

Since any point on the contact line 67 is a point on the alignment clearance face 64, the x and y components of the point $P_3$ $(x_3, y_3, z_3)$ can be defined by choosing the point that intersects with the Y axis on the XY plane for the embodiment shown in FIG. 4(a) as follows in equation (6):

$$P_3(x_3, y_3) = (0, -D_{CL}/\sin(H)) = (0, -[D/2 + \tan(V) \times (r + r \times \sin(V))]/\sin(H)) \quad (6)$$

Thus the point $P_3$ ($x_3$, $y_3$, $z_3$) is now completely defined as follows in equation (7):

$$P_3(x_3, y_3, z_3) = (0, -[D/2 + \tan(V) \times (r + r \times \sin(V))]/\sin(H), r + r \times \sin(V) - T) \quad (7)$$

Once all three points, $P_1$ ($x_1$, $y_1$, $z_1$), $P_2$ ($x_2$, $y_2$, $z_2$) and $P_3$ ($x_3$, $y_3$, $z_3$) are obtained, equation (1) in matrix format can be converted into the following general form as equation (8):

$$ax + by + cz + d = 0 \quad (8)$$

where a, b, c, and d are constants. Since the alignment clearance face is solely defined by the equation (8), it may be used as a quantitative reference for all possible members of a family of generally parallelogram-shaped cutting insert having varying corner nose radii. In this way, the appropriate geometry of the alignment clearance face of a family of inserts can be determined, and each insert within the family may be securely retained on a single associated tool holder.

Figure 5:
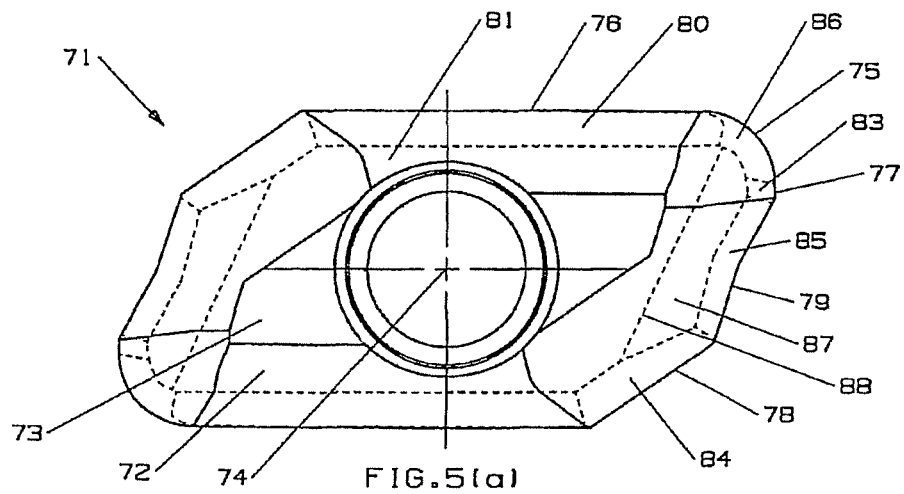
FIGS. 5(a)-5(c) are schematic views of a top face (FIG. 5(a)), a radial side (FIG. 5(b)), and an axial side (FIG. 5(c)) of an additional non-limiting embodiment of a generally parallelogram-shaped cutting insert according to the present disclosure, wherein a chip groove is shown on the top face thereof.
Figure 5:
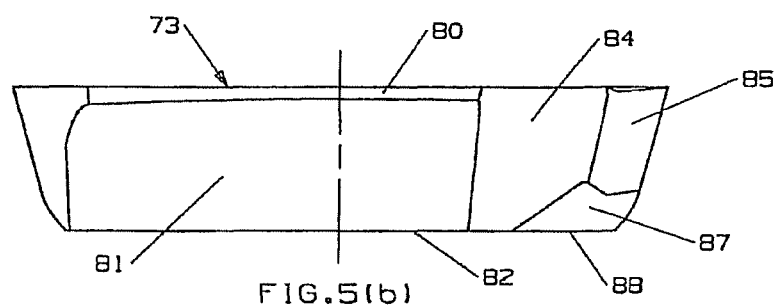
Figure 5:
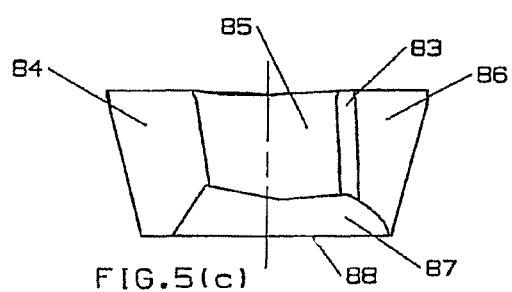

FIGS. 5 (a)-(c) schematically depict an additional non-limiting embodiment of a generally parallelogram-shaped cutting insert 71 according to the present disclosure adapted for peripheral milling applications and having chip groove geometry 72 on the top face 73. Similar to the insert 30 depicted in FIGS. 3(a)-(d), cutting insert 71 is 180° symmetric about the axis of the center hole 74. Cutting insert 71 includes corner nose 75, radial cutting edge 76, primary axial cutting edge 77, secondary axial cutting edge 78, and a bridging cutting edge 79 connecting the primary axial cutting edge 77 and the secondary axial cutting edge 78. Cutting insert 71 further includes primary radial clearance face 80 below the radial cutting edge 76, secondary radial clearance face 81 ending at the bottom face 82, primary axial clearance face 83 below the primary axial cutting edge 77, secondary axial clearance face 84 below the secondary axial cutting edge 78, a bridging clearance face 85 below the bridging cutting edge 79, and a conical clearance face 86 below the corner nose 75. The cutting insert 71 includes an axial alignment clearance face 87 which intersects the primary axial clearance face 83, the secondary axial clearance face 84, the bridging clearance face 85 and the conical clearance face 86, and the bottom face 82 at the bottom edge 88. The axial alignment clearance face 87 may be defined to lie within a plane including points $P_1$, $P_2$ and $P_3$ positioned as discussed above in connection with cutting insert 30. Each cutting insert within a family of cutting inserts including cutting insert 71 includes axial alignment clearance faces defining an equivalent face location and an equivalent clearance angle when the inserts are securely retained in an insert pocket of a single associated tool holder. In this way, each insert within the family may be securely attached to a single tool holder which, for example, may have a conventional design.

It will be understood that although the present disclosure necessarily depicts only a limited number of embodiments within the scope of the present invention, other possible embodiments will be readily apparent to those having ordinary skill upon considering the present description. For example, although the present description depicts cutting insert embodiments including either a flat top face or a top face including chip groove geometry thereon, other top face geometry may be used such as, for example, an angled flat face or a curved surface.

FIGS. 6(a) and (b) schematically depict three superimposed generally parallelogram-shaped cutting inserts 90, 91, 92 within a peripheral milling cutting insert family designed according to the present disclosure. Each insert 90, 91, 92 has a different corner nose radius. FIG. 6(a) depicts cutting inserts 90, 91, 92 superimposed in a top face view wherein cutting insert 90 has the smallest corner nose radius, cutting insert 91 has a larger nose radius than that of the cutting insert 90, and cutting insert 92 has the largest corner nose radius. To simplify FIGS. 6(a) and (b), all lines showing individual features of the inserts have been deleted except for those representing bottom face 93 and the alignment clearance faces of the three cutting inserts 90, 91, 92. As shown in FIG. 6(a), the surfaces 94 bounded by the short broken lines and edge 97 are the alignment clearance faces of the cutting insert 90. The surfaces 95 bounded by the phantom lines and edge 97 represent the alignment clearance faces of the cutting insert 91. The surfaces 96 bounded by the long dashed lines and edge 97 represent the alignment clearance faces of the cutting insert 92. All three alignment clearance faces 94, 95, 96 lie in the same plane and intersect the bottom face 93 at bottom edge 97, which is shown in short dotted lines in FIG. 6(a). Further, the three alignment clearance faces 94, 95, 96 have the same clearance angle V as shown in FIG. 6(b), which is a view created from a projection parallel to the bottom edge 97, as indicated by the arrow K in FIG. 6(a). Thus, each of cutting inserts 90, 91, 92 have an alignment clearance face with an identical clearance angle and lying within the same plane defined according to the above-described equations (1) to (8).

Given the common and aligned geometric features of the alignment clearance face of each of cutting inserts 90, 91, 92, a single associated tool holder may be used to individually accommodate all three of the cutting inserts. Each insert may be secured in an insert pocket of the tool holder by conventional fastening means. In this way, a single associated tool holder may be used to securely retain any of cutting inserts 90, 91, 92 in a position suitable for peripheral milling operations, irrespective of the fact that the inserts have significantly different corner nose radii. Although FIGS. 6(a) and (b) only depict three generally parallelogram-shaped cutting inserts within the family, it will be apparent that a practically infinite number of inserts may be designed that fall within the family and that include an alignment clearance face having the clearance angle of faces 94, 95, 96, and extending within the plane in which faces 94, 95, 96 extend. All such inserts may be secured within the insert pocket of the associated tool holder.

Figure 7:
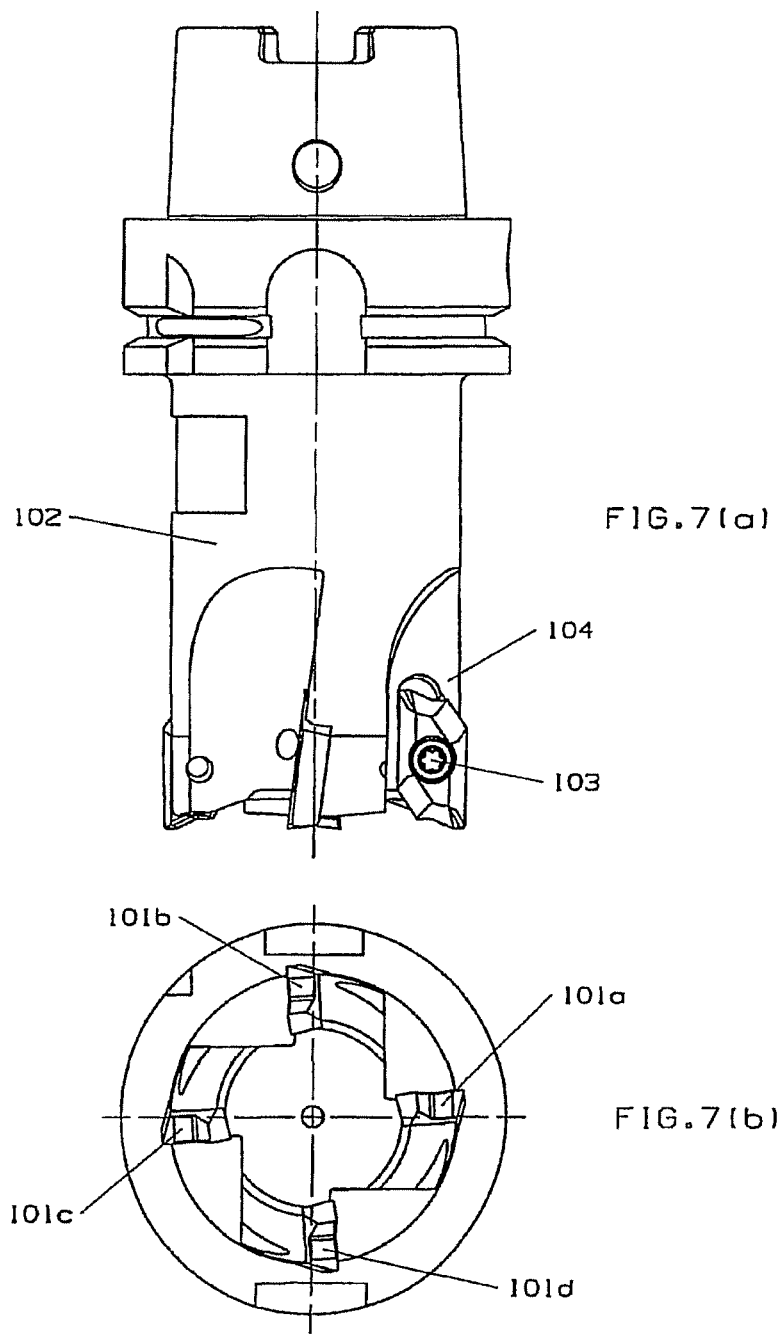
FIGS. 7(a) and 7(b) depict one non-limiting embodiment of a peripheral milling cutting tool system according to the present disclosure including a plurality of identical generally parallelogram-shaped cutting inserts and an associated tool holder.

FIG. 7 depicts one non-limiting embodiment of a peripheral milling tool assembly according to the present disclosure including four parallelogram-shaped cutting inserts 101a, 101b, 101c and 101d having a design similar to that shown in FIGS. 5(a)-(c) and a tool holder 102 that receives the cutting inserts. The cutting inserts 101a, 101b, 101c and 101d have the same corner nose radius and are secured by way of a screw 103 into the four identical insert pockets 104 of the tool holder 102.

Figure 8:
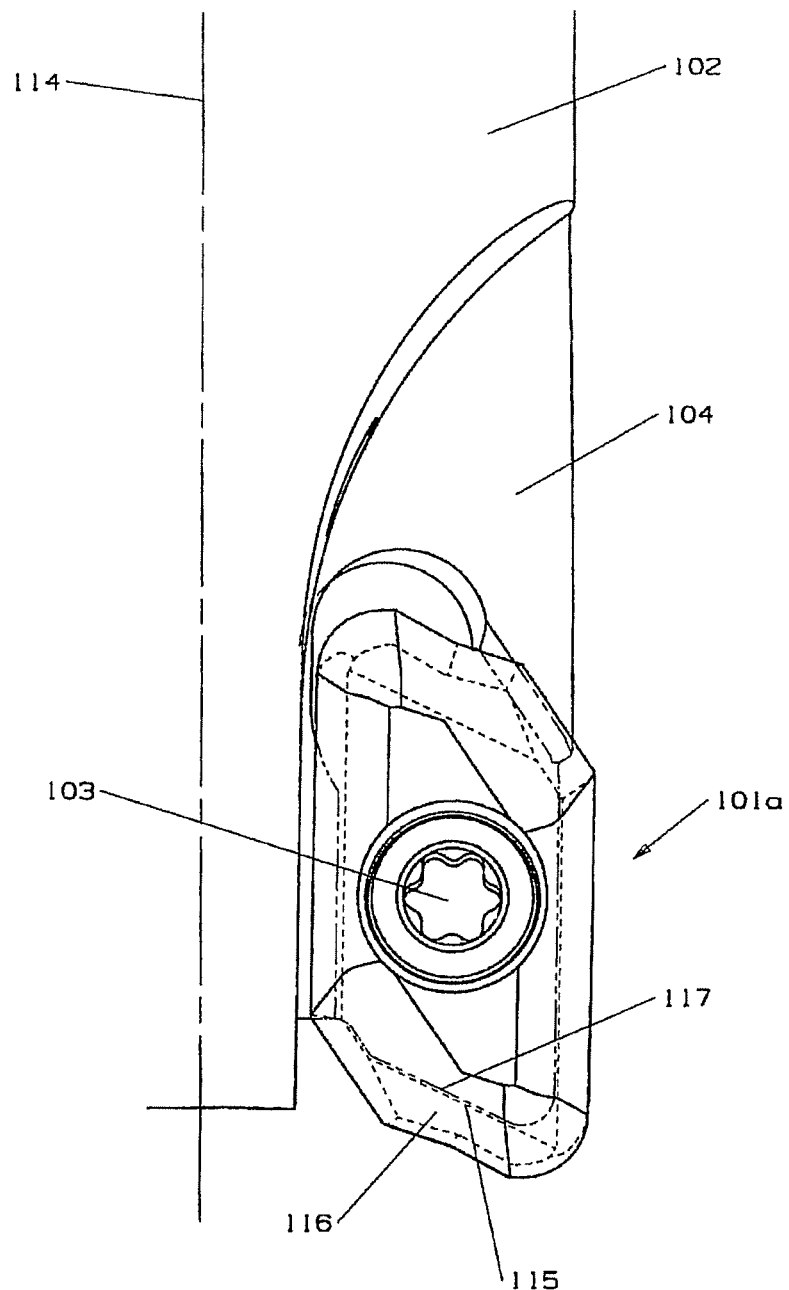
FIG. 8 is a schematic close-up view of a cutting insert and an insert pocket of the cutting tool assembly depicted in FIGS. 7(a) and 7(b)

FIG. 8 depicts a close-up view of a cutting insert and an insert pocket included in the peripheral milling tool assembly depicted in FIGS. 7(a) and (b). Cutting insert 101a is secured by a screw 103 into insert pocket 104 of tool holder 102, which is symmetric about central axis 114. Cutting insert 101a is positioned so that the bottom edge 115 of alignment clearance face 116 is parallel or substantially parallel to front-end edge 117 of insert pocket 104. A family of cutting inserts including varying corner nose radii may be provided including alignment clearance faces having a common and aligned geometry relative to cutting insert 101a. A single associated tool holder may be designed to include an insert pocket 104 as shown in FIG. 8 including a front-end edge 117 to receive and securely retain each of the family members, irrespective of the corner nose radius of the particular cutting insert within the family. It will be understood that by including an alignment clearance face that has the clearance angle of alignment clearance face 116 and that is disposed in the same plane in which alignment clearance face is disposed when secured within the insert pocket of the tool holder 102, the entire family of generally parallelogram-shaped cutting inserts may be accommodated by tool holder 102.

Figure 9:
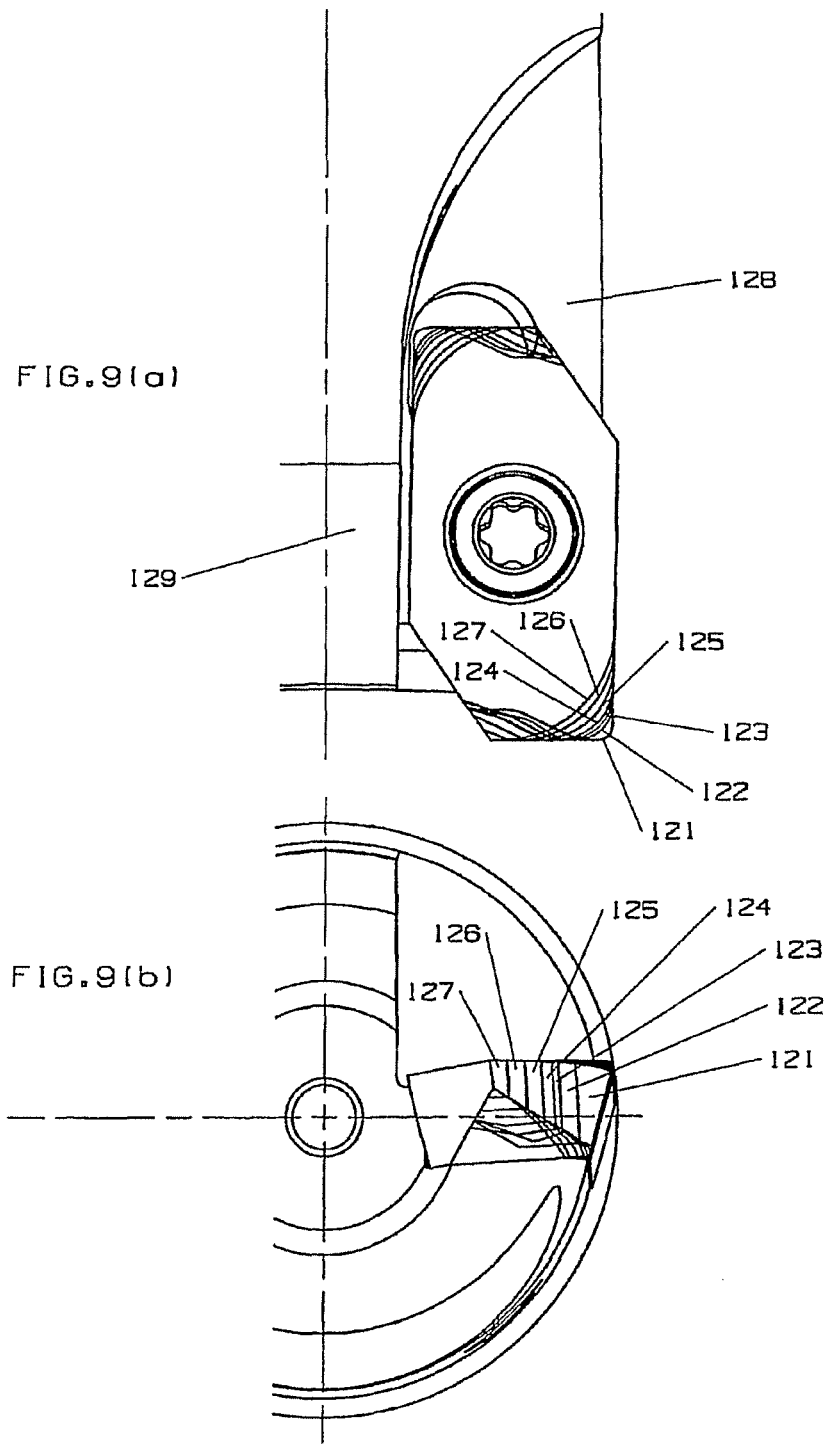
FIGS. 9(a) and 9(b) depict aspects of a representative family of seven superimposed generally parallelogram-shaped cutting inserts having various corner nose radii according to certain non-limiting embodiments herein, wherein the cutting inserts are shown mounted in an insert pocket of an associated peripheral milling tool holder.

FIGS. 9(a) and (b) schematically depict a close-up view of a representative family of seven generally parallelogram-shaped cutting inserts and an associated peripheral milling tool holder according to an embodiment of the present disclosure, wherein the inserts are depicted superimposed on one another to better illustrate their common positioning within the tool holder's insert pocket. FIG. 9(b) is an on-end view of a region of the cutting tool system, and FIG. 9(a) is a partial side view depicting a cutting tool insert pocket and a cutting insert mounted within the insert pocket. In each of FIGS. 9(a) and (b), the seven cutting inserts 121-127 within the family are superimposed on one another in a position secured within insert pocket 128 of the tool holder 129. The cutting inserts 121-127 have corner nose radii equal to 0.8 mm, 2.0 mm, 2.5 mm, 3.0 mm, 4.0 mm, 5.0 mm, and 6.0 mm, respectively. Each radial end of cutting inserts 121-127 includes an alignment clearance face with substantially equal clearance angles and which may extend within identical planes when secured to the associated tool holder 129. Therefore, each of the seven cutting inserts 121-127 can be accommodated on the single tool holder 129, as shown in FIGS. 9(a) and 9(b). As discussed herein, such a unique design provides substantial advantages to cutting tool manufactures and end users, including reduced inventory, increased productivity, simplified production, and reduced monetary expenditure.

Figure 10:
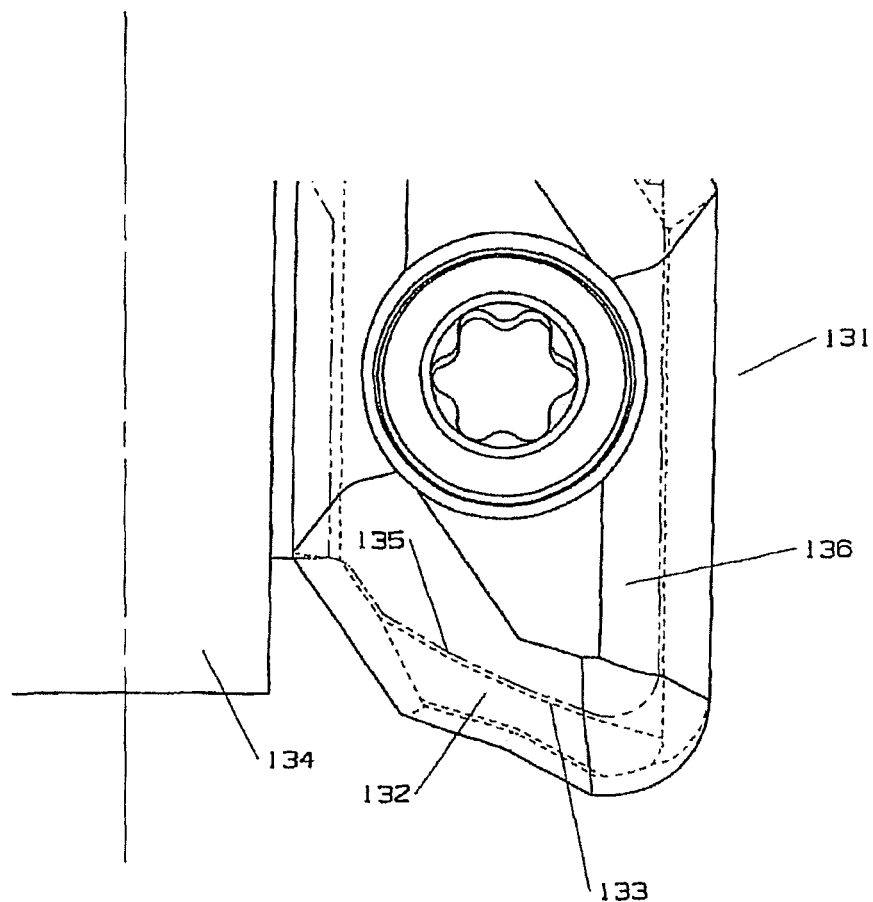
FIG. 10 depicts a portion of one non-limiting embodiment of a generally parallelogram-shaped cutting insert according to the present disclosure, wherein the cutting insert includes a conical alignment clearance face.

Further, non-limiting embodiments of the generally parallelogram-shaped cutting insert according to the present disclosure may have a conical alignment clearance face. FIG. 10 schematically depicts a portion of a non-limiting embodiment of a generally parallelogram-shaped cutting insert 131 for peripheral milling application, wherein certain obscured features are shown in phantom lines. Insert 131 includes conical alignment clearance face 132 (bordered by dotted lines). Conical alignment clearance face 132 includes a radius at the bottom edge 133 thereof. Also shown in FIG. 10 is an associated peripheral milling tool holder 134 wherein the front end edge 135 of the insert pocket 136 (illustrated by phantom lines) has a curved geometry and is substantially concentric to the radiused bottom edge 133 of the conical alignment clearance face 132 of cutting insert 131.

Figure 11:
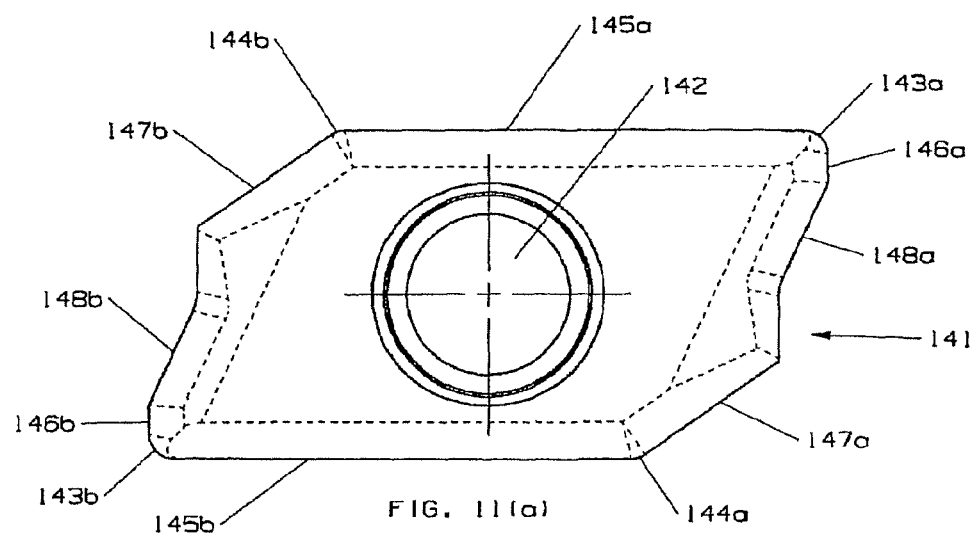
FIGS. 11(a) and 11(b) depict top faces of two non-limiting embodiments of generally parallelogram-shaped cutting inserts according to the present disclosure, wherein each insert includes a pair of major nose corners and a pair of minor nose corners.
Figure 11:
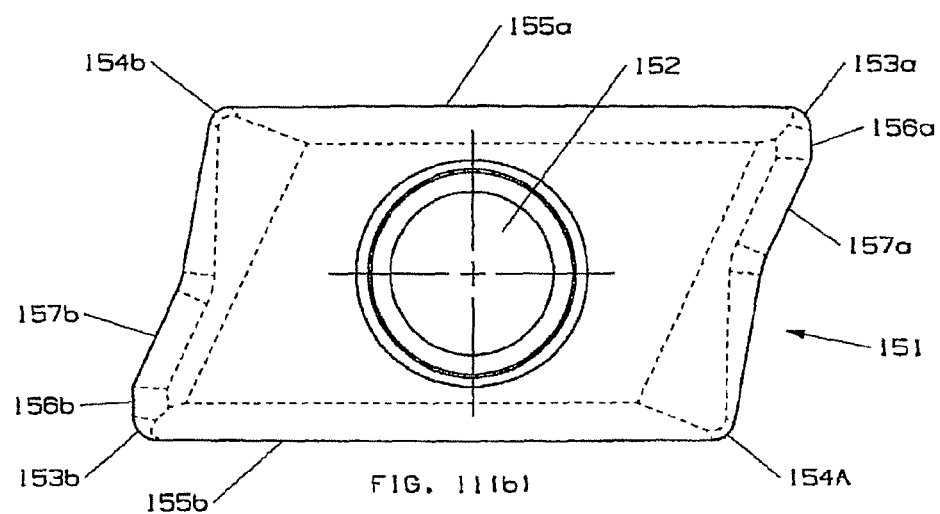

FIGS. 11(a) and (b) schematically depict two additional non-limiting embodiments of a cutting insert adapted for peripheral milling applications according to the present disclosure. Each of the generally parallelogram-shaped cutting inserts 141 and 151 shown in FIGS. 11(a) and (b), respectively, include a pair of major corner noses (which are equivalent in function to the corner noses of the inventive embodiments discussed above) and a pair of minor corner noses. With reference to FIG. 11(a), cutting insert 141 is 180° symmetric about the axis of center hole 142 and includes: a pair of major corner noses 143a and 143b; a pair of minor corner noses 144a and 144b; a pair of radial cutting edges 145a and 145b; a pair of primary axial cutting edges 146a and 146b; a pair of secondary axial cutting edges 147a and 147b; and a pair of bridging cutting edges 148a and 148b, each connecting a primary axial cutting edge (146a or 146b) and a secondary axial cutting edge (148a or 148b). With reference to FIG. 11(b), cutting insert 151 is 180° symmetric about the axis of center hole 152 and includes: a pair of major corner noses 153a and 153b; a pair of minor corner noses 154a and 154b; a pair of radial cutting edges 155a and 155b; a pair of axial cutting edges 156a and 156b; and a pair of bridging cutting edges 157a and 157b, each connecting an axial cutting edge (156a or 156b) and a minor corner nose (154a or 154b).

Generally parallelogram-shaped cutting inserts are typically used in peripheral rotary milling due to the relatively large depth of cut achieved by the main cutting edge, which is long relative to, for example, square cutting inserts. Due to the complex geometry of a parallelogram-shaped cutting insert and the need for a family of such cutting inserts having different corner nose radii (with the same insert width), multiple tool holders are currently required to accommodate the entire family. This is because, for example, as the corner nose radius increases, it becomes difficult to accommodate the inserts having larger corner nose radii on tool holders designed to accommodate inserts having smaller corner nose radii. Tool systems according to the present disclosure allow use of a single tool holder to accommodate a family of cutting inserts having widely differing corner nose radii. The design of the tool holder may be, for example, a conventional design capable of securely retaining the cutting inserts in an orientation suitable for the intended machining operation.

Accordingly, certain non-limiting embodiments according to the present disclosure relate to multiple parallelogram-shaped cutting inserts adapted to peripheral milling application and having differing corner nose radii, and to related cutting tool systems. The parallelogram-shaped cutting inserts described herein may be of conventional size and adapted for conventional use in a variety of peripheral milling applications. It will be understood that the present description illustrates those aspects of the invention relevant to a clear understanding of the invention. Certain aspects that would be apparent to those of ordinary skill in the art and that, therefore, would not facilitate a better understanding of the invention have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the foregoing description and the following claims.

We claim:

1. A cutting insert system, comprising:
a plurality of indexable peripheral milling cutting inserts adapted to be mounted on a single peripheral milling tool holder, wherein each of the cutting inserts comprises
an insert width, wherein the insert width is the same for each of the cutting inserts,
a corner nose having a corner nose radius dimension, wherein the corner nose radius dimension is different for each of the cutting inserts, and
an axial alignment clearance face, wherein the axial alignment clearance face defines an equivalent face location and an equivalent clearance angle for each of the cutting inserts when detachably mounted on the single peripheral milling tool holder.

2. The cutting insert system of claim 1, wherein the axial alignment clearance face of each of the cutting inserts is substantially planar.

3. The cutting insert system of claim 1, wherein the axial alignment clearance face of each of the cutting inserts is substantially conical.

4. The cutting insert system of claim 1, wherein each of the cutting inserts is generally parallelogram-shaped.

5. The cutting insert system of claim 1, wherein each of the cutting inserts further comprises a minor corner nose.

6. The cutting insert system of claim 4, wherein each of the cutting inserts further comprises:
a top face, comprising
a radial cutting edge extending substantially to the corner nose,
a primary axial cutting edge extending oppositely from the corner nose,
a bridging cutting edge extending obtusely from the primary axial cutting edge, and
a secondary axial cutting edge extending obtusely from the bridging cutting edge.

7. The cutting insert system of claim 6, wherein the top face comprises one or more of a flat face, an angled flat face, a curved surface, and a chip groove geometry.

8. A cutting tool system, comprising:
a tool holder comprising at least one insert pocket; and
a plurality of indexable peripheral milling cutting inserts, wherein each of the cutting inserts is adapted to be securely retained in the insert pocket and comprises
an insert width, wherein the insert width is the same for each of the cutting inserts,
a corner nose having a corner nose radius dimension, wherein the corner nose radius dimension is different for each of the cutting inserts, and
an axial alignment clearance face, wherein the axial alignment clearance face defines an equivalent face location and an equivalent clearance angle for each of the cutting inserts when securely retained in the at least one insert pocket of the tool holder.

9. The cutting tool system of claim 8, wherein the axial alignment clearance face of each of the cutting inserts is substantially planar.

10. The cutting tool system of claim 8, wherein the axial alignment clearance face of each of the cutting inserts is substantially conical.

11. The cutting tool system of claim 8, wherein each of the cutting inserts is generally parallelogram-shaped.

12. The cutting tool system of claim 8, wherein each of the cutting inserts further comprises:
a top face comprising
a radial cutting edge extending substantially to the corner nose,
a primary axial cutting edge extending oppositely from the corner nose,
a bridging cutting edge extending obtusely from the primary axial cutting edge, and
a secondary axial cutting edge extending obtusely from the bridging cutting edge;
a primary radial clearance face inclined downwardly from the radial cutting edge;
a conical clearance face inclined downwardly from the corner nose;
a primary axial clearance face inclined downwardly from the primary axial cutting edge;
a bridging clearance face extending downwardly from the bridging cutting edge; and
a secondary axial clearance face extending downwardly from the secondary axial cutting edge.

13. The cutting tool system of claim 12, wherein each of the cutting inserts further comprises a secondary radial clearance face inclined downwardly from the primary radial clearance face.

14. The cutting tool system of claim 12, wherein:
the axial alignment clearance face intersects with the conical clearance face, the primary axial clearance face, the bridging clearance face, and the secondary axial clearance face; the axial alignment clearance face further comprises a bottom edge;
each of the cutting inserts further comprises a bottom face; and
the bottom edge of the axial alignment clearance face intersects the bottom face.

15. The cutting tool system of claim 12, wherein the top face comprises one or more of a flat face, an angled flat face, a curved surface, and a face having a chip groove geometry.

16. A cutting tool system comprising:
a peripheral milling tool holder including at least one insert pocket on a translatable portion of the tool holder; and
a plurality of indexable peripheral milling cutting inserts having differing corner nose radii, wherein each of the cutting inserts includes a common geometric feature and can be securely retained within the insert pocket of the tool holder in a position suitable for machining a workpiece.

17. The cutting tool system of claim 16, wherein each of the cutting inserts is generally parallelogram-shaped.

18. The cutting tool system of claim 17, wherein the common geometric feature of each of the cutting inserts is an axial alignment clearance face defining an axial alignment face position and a clearance angle that is substantially identical on each of the cutting inserts.

19. The cutting tool system of claim 17, wherein each axial alignment clearance face is one of substantially planar and substantially conical.

20. The cutting insert system of claim 1, wherein the plurality of cutting inserts comprises a first cutting insert having a first corner nose radius, a second cutting insert having a second corner nose radius, and a third cutting insert having a third corner nose radius, and wherein the first corner nose radius is greater than the second corner nose radius, and the second corner nose radius is greater than the third corner nose radius.

21. The cutting tool system of claim 8, wherein the tool holder comprises a front-end edge adapted to receive and securely retain each of the plurality of cutting inserts.

22. The cutting tool system of claim 8,
wherein the insert pocket of the tool holder comprises a front end edge having a curved geometry,
and wherein when one of the cutting inserts is securely retained in the insert pocket of the tool holder, the front end edge of the insert pocket is substantially concentric to a radiused bottom edge of the axial alignment clearance face of the cutting insert.

* * * * *